(12) United States Patent
Woodward

(10) Patent No.: US 6,363,567 B1
(45) Date of Patent: Apr. 2, 2002

(54) VEHICLE MOUNTED RETRACTABLE GOLF SHOE BRUSH

(76) Inventor: Jay J. Woodward, 4454 S. Golf Estates Dr., Green Valley, AZ (US) 85614

(*) Notice: Subject to any disclaimer, the term of this patent is extended or adjusted under 35 U.S.C. 154(b) by 0 days.

(21) Appl. No.: 09/495,536

(22) Filed: Jan. 31, 2000

Related U.S. Application Data

(60) Provisional application No. 60/137,276, filed on Jun. 1, 1999.

(51) Int. Cl.[7] .......................... A46B 15/00; A47L 23/00; B60R 3/04
(52) U.S. Cl. .......................... 15/161; 15/237; 280/164.2
(58) Field of Search ................... 15/112, 161, 215–217, 15/237; 280/164.2

(56) References Cited

U.S. PATENT DOCUMENTS

| | | | | |
|---|---|---|---|---|
| 1,196,453 A | * | 8/1916 | Hatfield .................... | 280/164.2 |
| 1,670,867 A | * | 5/1928 | Paskal ....................... | 15/112 |
| 1,718,428 A | * | 6/1929 | McNulty .................... | 15/237 |
| 1,870,333 A | * | 8/1932 | Kadavy ..................... | 15/237 |
| 1,946,578 A | * | 2/1934 | Glauber et al. .............. | 15/237 |
| 2,579,006 A | * | 12/1951 | Mims ........................ | 15/237 |
| 2,818,594 A | * | 1/1958 | Dawkins .................... | 15/237 |
| 2,979,340 A | * | 4/1961 | Morrissey .................. | 280/164.2 |
| 3,659,303 A | * | 5/1972 | Schroder et al. ............. | 15/112 |
| 5,230,117 A | | 7/1993 | Johnson et al. .............. | 15/106 |
| 5,479,674 A | | 1/1996 | Gilcrest ..................... | 15/161 |
| 5,815,873 A | | 10/1998 | Jones ....................... | 15/106 |
| 5,970,561 A | * | 10/1999 | Archibeque ................ | 15/161 |

FOREIGN PATENT DOCUMENTS

| | | | | |
|---|---|---|---|---|
| AU | 165777 | * | 10/1955 | ............... 280/164.2 |
| DE | 1901836 | * | 8/1970 | ................... 15/161 |
| GB | 4148 | * | 2/1913 | ................... 15/215 |

* cited by examiner

*Primary Examiner*—Mark Spisich
(74) *Attorney, Agent, or Firm*—Edward A. Sokolski

(57) ABSTRACT

A shoe brush is mounted for slidable motion between a retracted position and an extended position. The brush is fixedly attached to longitudinally extending support members which are mounted for slidable motion on a support which is fixedly connected to the underside of a vehicle. A spring assembly is connected to the brush support urging the brush to the retracted position. The brush is drawn outwardly against the tension of the spring assembly to an extended position for utilization in brushing shoes. A latch member retains the brush in this extended position unless and until it is released to permit the spring to draw the brush to the retracted position.

10 Claims, 4 Drawing Sheets

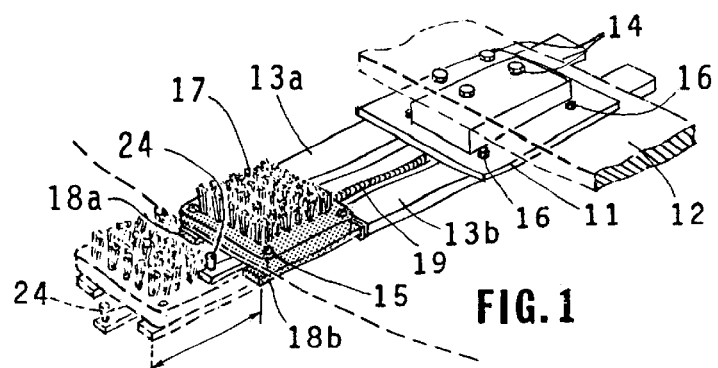
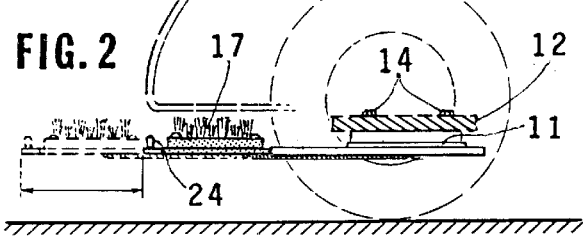
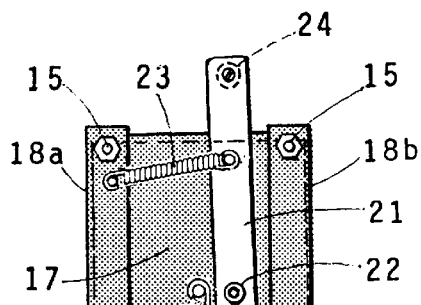
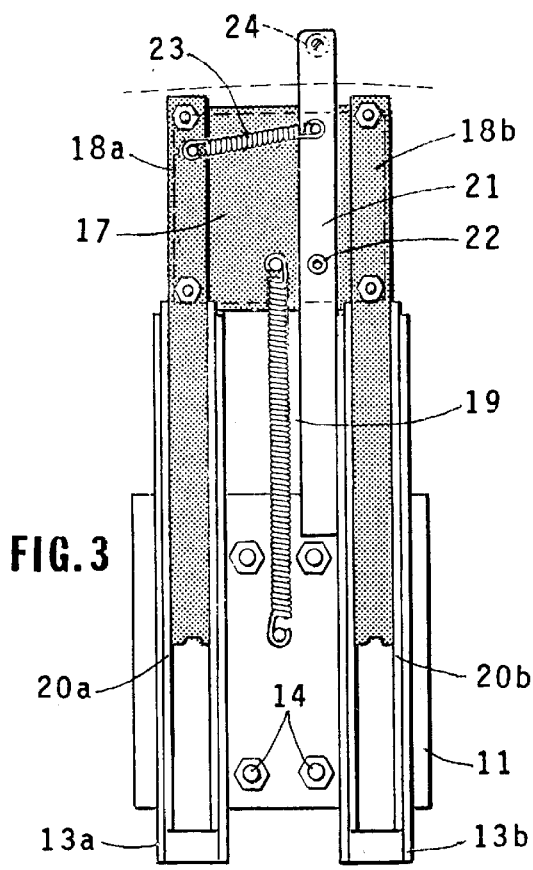
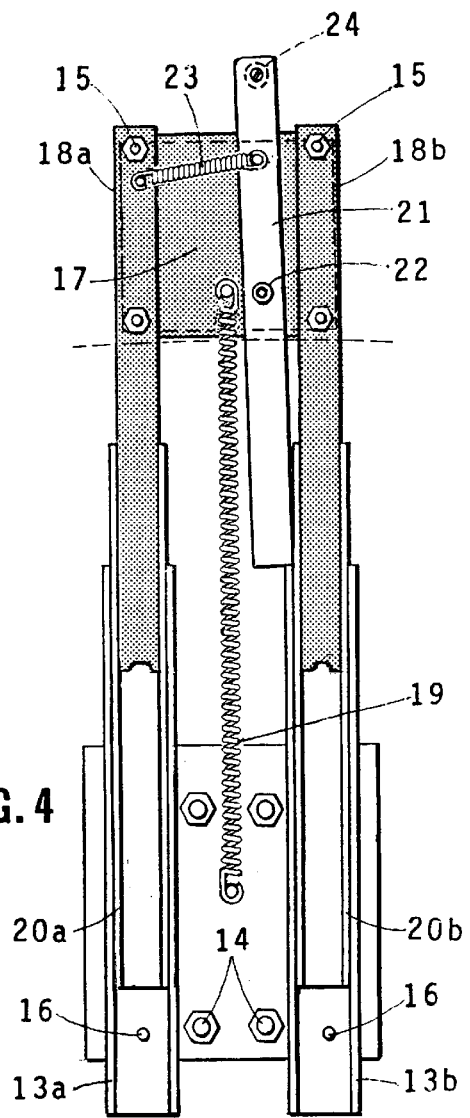

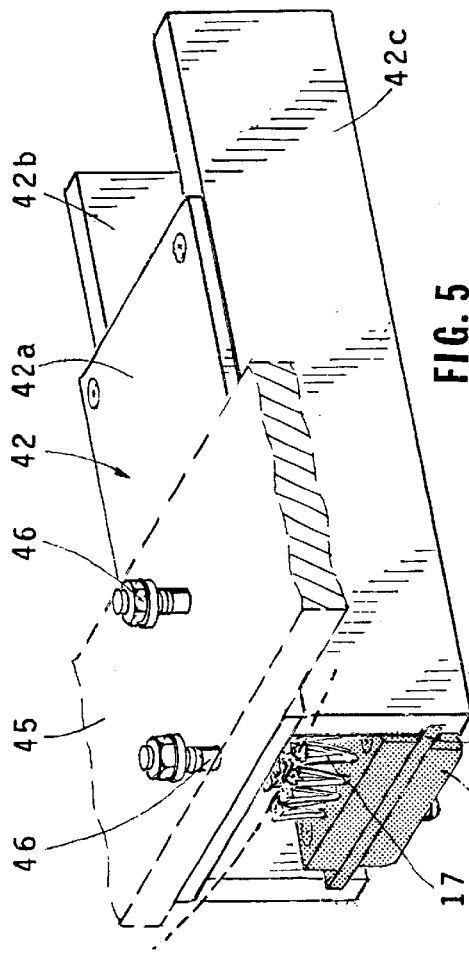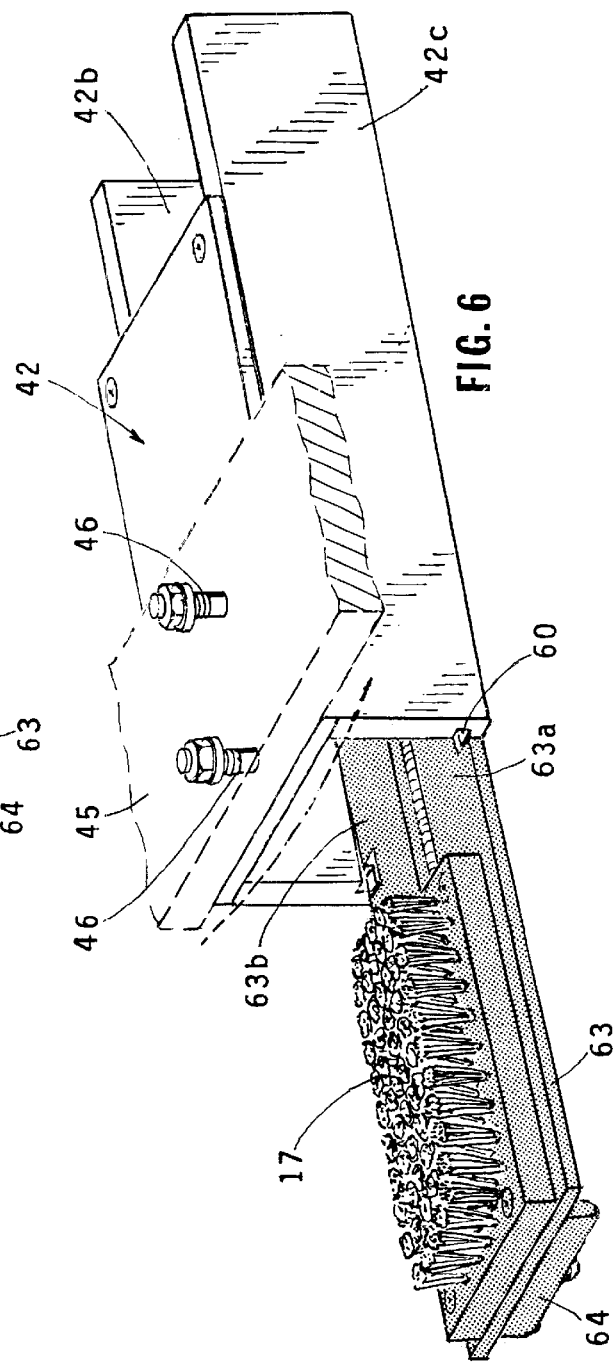

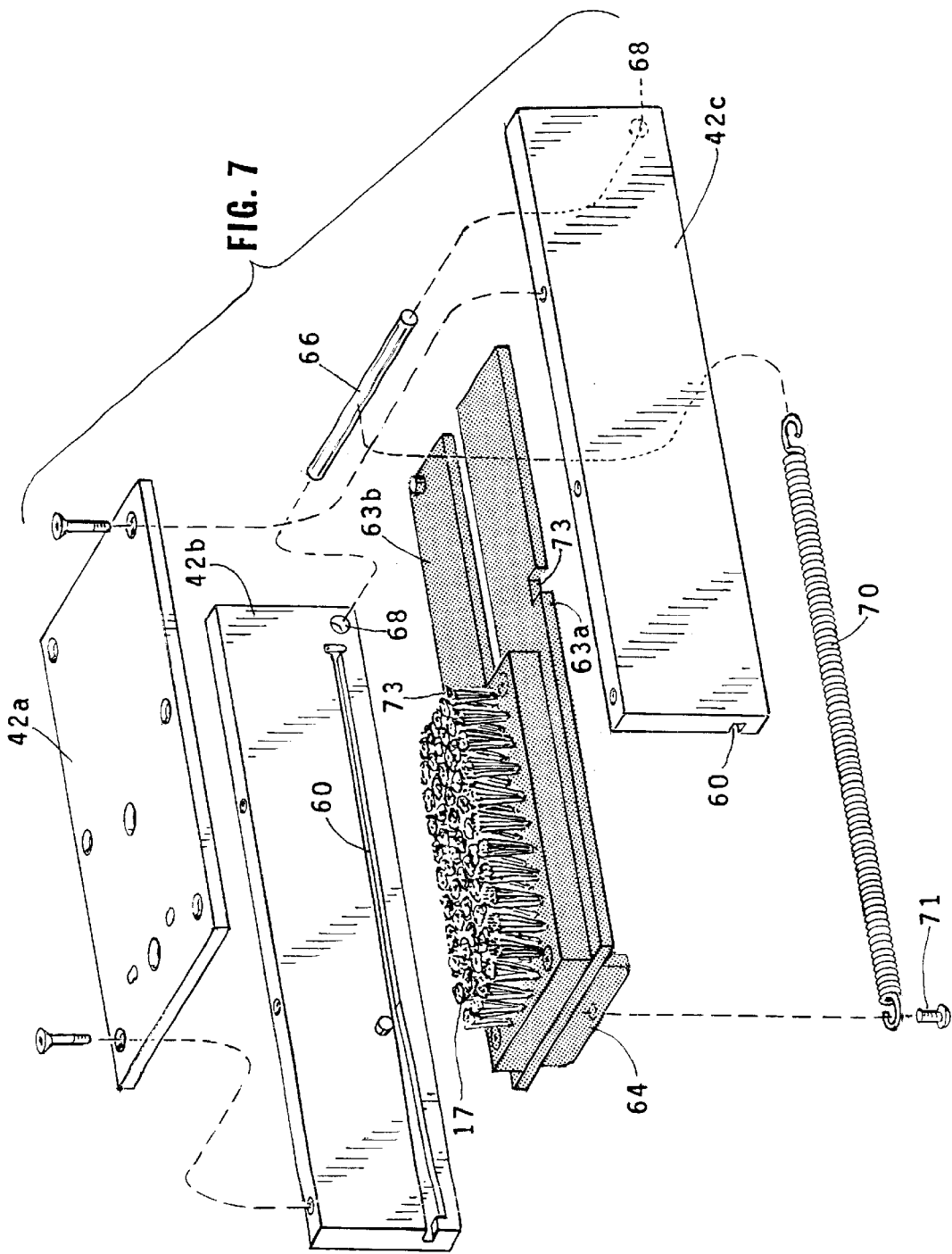

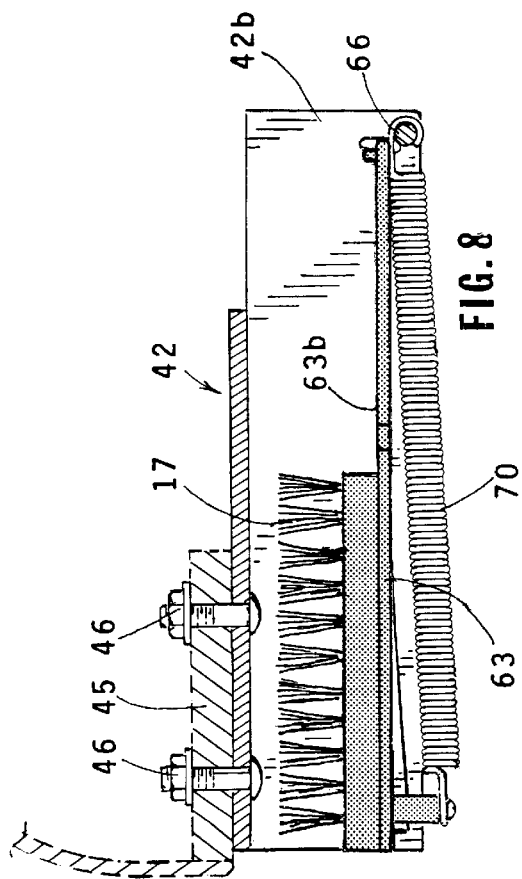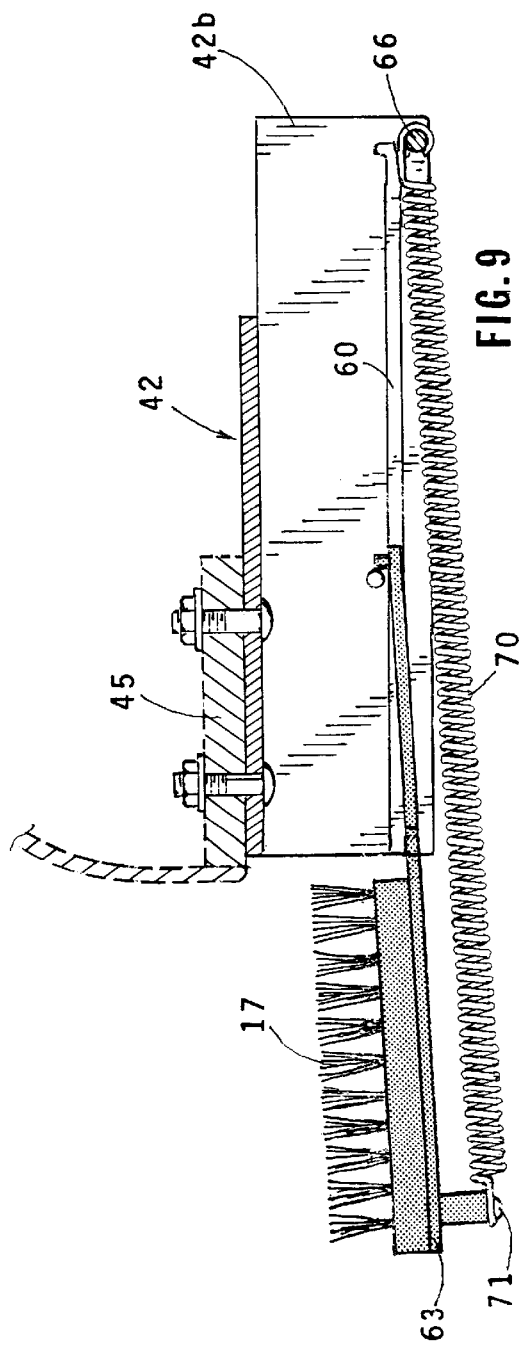

VEHICLE MOUNTED RETRACTABLE GOLF SHOE BRUSH

This application enjoys the priority of provisional application No. 60/137,276 filed Jun. 1, 1999

BACKGROUND OF THE INVENTION

1. Field of the Invention

This invention relates to shoe brushes and more particularly to such a brush which is mounted on a vehicle and is movable between a retracted position within a housing and an extended position outside of such housing for utilization.

2. Description of the Related Art

Golf shoe brushes are generally used by golfers for removing earth and grass from golf cleats both while playing to assure a firm foothold on the ground and to avoid soiling the greens, and after playing to avoid soiling the floor of a golf cart. Hand brushes are generally used for this purpose, such brushes after being installed in a golf bag. Such golf bag attached brushes are described in U.S. Pat. No. 5,230,117 issued Jul. 27, 1993 to Johnson, et al; U.S. Pat. No. 5,815,873 issued Oct. 6, 1998 to Jones; and U.S. Pat. No. 5,1479,674 issued Jan. 2, 1996 to Gilcrest.

The Jones and Johnson patents describe golf shoe brushes which are suspended from a golf bag and which have extension cables that are spring urged into the bag, with such lines being withdrawn by the user when the brushes are manually utilized to brush the user's shoes. Gilcrest describes a shoe brush which is mounted in a retainer pivotally supported on the base of a golf bag. The brush is slidably mounted in the retainer and the retainer moved between an upright position for stowing the brush and a horizontal position where the brush can be utilized by the user by scraping his shoes against the brush. Jones and Johnson have the disadvantage of requiring that the user manually use the brush to scrape his or her shoes. Gilcrest while it provides for brushing one's shoes while standing up is not adapted for mounting on a vehicle. Further, in Gilcrest the brush must be manually moved between the stowed and extended positions and further is not stowed in a retracted fashion beneath the support on which it is mounted.

SUMMARY OF THE INVENTION

The brush device of the present invention is an improvement over the prior art in that it can be mounted on a vehicle positioned underneath the vehicle where it is stowed. Further in the device of present invention, the brush is moved between a retracted stowed position and an extended position manually with return to the retracted position being achieved by spring action.

The device of the invention has a pair of longitudinally extending spaced apart members which may be in the form of arms, bars, rods, or a plate to which the brush is attached at one of its ends. Channel members which may be in the form of slotted portions into which the runner members are fitted are attached to the underside of a vehicle such as a golf cart preferably in a manner so that they do not protrude out from the frame of the vehicle. The brush and runner members are driven to a retracted position under the vehicle by one or more springs which are attached at one end to the runner members and the other end to a mount attached to the vehicle. In one embodiment, a housing is provided in which the retracted brush is retained. The support members and the brush are manually drawn outwardly to the extended position to enable utilization of the brush. A latch member retains the brush in the extended position against the spring tension. This latch may be released either manually or by foot action to permit the spring to drive the brush back to the retracted position.

It is therefore an object of this invention to provide a golf shoe brush which can more easily and rapidly be utilized and stowed when not in use.

Other objects of the invention will become apparent as the description proceeds in connection with the accompanying drawings.

DESCRIPTION OF THE DRAWINGS

FIG. 1 is a top front perspective view of a first embodiment of my invention;

FIG. 2 is a side elevational view of the first embodiment;

FIG. 3 is a bottom plan view of the first embodiment in the retracted position;

FIG. 4 is a bottom plan view of the first embodiment in the extended position;

FIG. 5 is a side perspective view of a second embodiment of the invention showing the brush retracted;

FIG. 6 is a top perspective view of the second embodiment with the brush in the extended position;

FIG. 7 is a exploded top perspective view of the second embodiment in the extended position;

FIG. 8 is a cross sectional view illustrating the second embodiment of the invention in the retracted position; and FIG. 9 is a cross sectional view illustrating the second embodiment in the extended position.

DETAILED DESCRIPTION OF THE INVENTION

Referring now to FIGS. 1–4, a first embodiment of the invention is illustrated. Support unit 11 is attached to the bottom 12 of golf cart(or other vehicle) means of bolts and nuts 14. Mount 11 must have sufficient thickness so that the brush 17 will clear the bottom of the cart in its retracted position. A pair of spaced apart oppositely positioned support members 13a and 13b which are in the form of channels are fixedly attached to mount 11 by means of bolts and nuts 16. Brush 17 is fixedly attached to a pair of oppositely positioned runners 18a and 18b by means of nuts and bolts 15, the runners being slidably mounted in channels 13a and 13b respectively.

spring 19 is fixedly attached at one end to the base of brush 17 and at the other end to mount 11. Spring 23 is attached at one end thereof to latching bar 21 and at the other end to runner 18a which is attached to brush 17. Latching bar is pivotally supported on the base of the brush by means of pivot pin 22. Spring 23 urges the end of the bar against the outer wall of channel 13b.

In FIGS. 1 and 2, the brush is shown in its retracted position in solid lines and its extended position in dotted lines. In FIG. 3, the brush is shown in its retracted position in FIG. 3 and its extended position in FIG. 4. In the retracted position, spring 19 draws the brush towards mount 11 to a final retracted position against the ends of channel members 13a and 13b, as can best be seen in FIG. 1. The brush is manually drawn to its extended position by means of knob 24. With spring 23 urging latching bar 21 against the outer wall of channel member 13b, the latching bar snaps into position in abutment against the end of channel 13b when it reaches the end of the channel member thereby retaining the brush in the retracted position as shown in FIG. 4. Inner slidable channels 20a and 20b are provided to facilitate the motion of the bars. The brush can be released to its retracted position merely by moving latching bar sideways by means of knob 24 to draw the end of the bar out of engagement with the end of channel member 13b. The spring 19 will then draw the brush to the retracted position of FIG. 3.

Referring now to FIGS. 5–9, a second embodiment of the invention is shown. In this embodiment, the brush 17 is retained in a housing 42 in its retracted position, this housing being attached to the underside 45 of a vehicle by means of nuts and bolts 46. The brush is shown in the retracted position in FIGS. 5 and 8 and the extended position in FIGS. 8 and 9.

A housing 42 for the brush is formed from top piece 42a and side pieces 42b and 42c, the top piece being screwed to the side pieces. The side pieces have slots 60 forming channels extending longitudinally therealong near the bottom end thereof.

Brush 17 is mounted on plate 63 which has a pair of arms 63a and 63b extending therefrom which with the plate form runners. The brush may be attached to the plate by means of bolts or by cementing. A cross piece 64 which forms a handle runs across the end of plate 63. Cross rod 66 runs between side walls 42a and 42b, fitting in apertures 68 formed in the side walls. Spring 70 hooks onto rod 66 at one end and onto screw 71 attached to cross piece 64 at the other end.

Slots 73 are formed in the side walls of arms 63a and 63b. As best shown in FIG. 6, the ends of side walls 42b and 42c latch into these slots in the extended position of the brush with slight downward pressure of the user although usually the weight of the brush will effect sufficient downward motion to enable the latching action. Slots 73 thus form latches which latch side walls 42b and 42c and the brush in the extended position.

To release the brush and permit to go from the extended to the retracted position, the user merely need lift slightly on cross piece handle 64 so that the sides of the arms enter slots 60 and spring 70 will retract plate 63 and the brush attached to it.

While the invention has been described and illustrated in detail, it is to be understood that this is intended by way of illustration and example only, the scope of the invention being limited by the terms of the following claims.

I claim:

1. A device for mounting a shoe brush on the underside of a vehicle for movement between retracted and extended positions comprising:

runner means attached at one end thereof to said brush;

channel means attached at one end thereof to the underside of said vehicle;

said runner means being slidably mounted in said channel means;

spring means connected at one end to a mount on the underside of the vehicle and at the other end adjacent to the brush and to one end of said runner means;

said spring means drawing said brush to the retracted position underneath the vehicle; and latch means for latching said brush in the extended position extended out from underneath the vehicle;

whereby when said brush is drawn outwardly from said vehicle against the spring tension of said spring means to the extended position, the latch means retains the brush in said extended position and when the latch means is released, the spring means draws the runner means and the brush to the retracted position.

2. The device of claim 1 wherein said runner means comprises a pair of longitudinally extending oppositely positioned spaced apart runners.

3. The device of claim 1 wherein said spring means comprises a single spring connected at one end to the brush and at the other end to the mount on the underside of said vehicle.

4. The device of claim 1 wherein said latch means comprises a latch member which is pivotally supported on the brush and spring means for urging said latch member against said runner means, said latch member abutting against one end of said channel means in the extended position.

5. The device of claim 1 wherein said latch means comprises a pair of oppositely positioned slots formed on said runner means, said slots engaging the ends of said channel means.

6. The device of claim 1 and further including a housing attached to the underside of said vehicle, said brush being drawn into said housing in the retracted position.

7. The device of claim 6 wherein said channel means is formed in the sides of said housing.

8. In a golf shoe assembly, an improvement consisting of a device for mounting said brush on the underneath of a vehicle for alternatively positioning said brush in a recessed position underneath the vehicle and an extended position away from the body of the vehicle comprising:

runner members attached at one end thereof to opposite sides of said brush and running longitudinally opposite each other from said brush towards the underneath of said vehicle;

a mount attached to the underneath of said vehicle;

a pair of channel members formed on opposite sides of said mount and running longitudinally opposite each other towards said brush;

said runner members being slidably mounted in said channel members;

means for use in drawing said brush outwardly from said recessed position to said extended position;

spring means for driving said brush from the extended position to the recessed position; and latch means for retaining said brush in the extended position, said brush being drawn by said spring means to the recessed position when said latch means is released.

9. The device of claim 8 wherein the spring means comprises a single spring connected between the mount and the brush.

10. The device of claim 8 wherein said latch means comprises a pair of oppositely positioned slots formed in said runner members, said slots engaging the ends of said channel members.

* * * * *